RE 25241

March 28, 1961 D. W. RANDOLPH 2,977,268
METHOD OF MAKING IMPREGNATED GLASS FIBER ARTICLES
Filed April 11, 1956 3 Sheets—Sheet 1

INVENTOR.
DONALD W. RANDOLPH
BY Ely, Pearne & Gordon
ATTORNEYS

INVENTOR.
DONALD W. RANDOLPH
BY Ely, Pearne & Gordon
ATTORNEYS

March 28, 1961 D. W. RANDOLPH 2,977,268
METHOD OF MAKING IMPREGNATED GLASS FIBER ARTICLES
Filed April 11, 1956 3 Sheets-Sheet 3

INVENTOR.
DONALD W. RANDOLPH
BY Ely, Pearne & Gordon
ATTORNEYS

United States Patent Office 2,977,268
Patented Mar. 28, 1961

2,977,268

METHOD OF MAKING IMPREGNATED GLASS FIBER ARTICLES

Donald W. Randolph, Gates Mills, Ohio, assignor to Structural Fibers, Inc., Bedford, Ohio, a corporation of Ohio Filed Apr. 11, 1956, Ser. No. 577,487

9 Claims. (Cl. 154—83)

This invention relates to the manufacture of fiber-reinforced molded articles and it pertains more particularly to the fabrication of such articles by laying up unwoven fiber mats approximately in the shape of the article to be produced and impregnating them with a liquid which is subject to curing or setting by application of a setting agent such as heat. The invention also relates to novel fiber-reinforced molded articles.

During recent years the manufacture of fiber-reinforced molded articles has been considerably stimulated because the balance between material costs and fabricating costs on the one hand and utility, strength and durability on the other hand has compared favorably with similar balances made in connection with older and more conventional methods and products.

One of the applications in which fiber-reinforced molded articles have long shown promise is in the manufacture of domestic water softener tanks and similar large water-tight and chemically resistant hollow objects. However, progress in this particular field has been limited because of high costs and other disadvantages inherent in the fabrication of several subassemblies prior to final assembly and fabrication of the completed product. Attempts to form a large integral one-piece hollow unit in a single pressure molding or forming operation have not been successful due to the fugitive nature of fiber matting when it is confined and compressed between narrowly spaced walls between which conventional settable liquid resins are forced under pressure. For example, when fiber matting is layed up in the approximate form of the desired object and encased in an external rigid mold between the mold walls and an expanding fluid-filled bag or envelope for applying the desired pressure to shape the matting, and thereupon an impregnating liquid is forced through the matting to permeate it, the liquid acts as a lubricant and the fibers tend to flow with the liquid, destroying the conformation of the layed-up matting. Permeation of the fiber matting by the impregnating liquid has also been accompanied by the entrapment of pockets of air within the interlaced fiber matting, resulting in the formation of voids in the final product. Such voids very seriously weaken the walls of the final product and render it useless.

According to the present invention, one-piece fiber-reinforced hollow tanks may be successfully and economically pressure molded. Articles made according to the present invention are reinforced throughout with substantially evenly distributed matted fibers, in a manner to be described below. The entrapment of air and the formation of voids is eliminated. Wall thickness of the final product is substantially uniform. All portions of the final product are cast in one integral piece, including the end walls thereof.

The invention contemplates partially permeating the walls of a hollow form of layed-up fiber matting with a thermosetting resin or the like while the matting is under only slight pressure, and then progressively compressing the walls in such a manner as to distribute the resin throughout the matting and achieve the desired effects of pressure molding, while at the same time avoiding migration of the fibers and destruction of the layed-up fiber mats.

The invention reduces the cost of manufacturing large fiber-reinforced hollow tanks and similar objects. According to the invention, large fiber-reinforced tanks are produced which are more useful and durable than those of the prior art.

These and other objects and advantages of the invention will become apparent from the following description of the invention, made by way of example. In the accompanying drawings which supplement the description:

Figure 1:
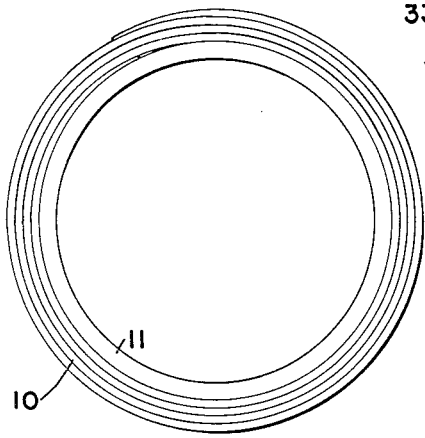
Figure 1 illustrates, somewhat schematically, an initial or preparatory step in the manufacture of fiber-reinforced hollow tanks according to the herein described example of the invention.
Figure 2:
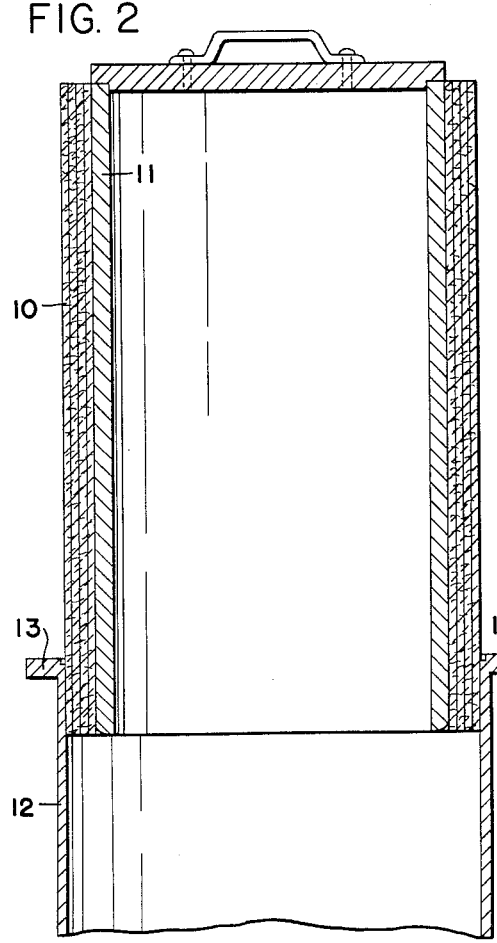
Figure 2 illustrates the insertion of a roll of fiber matting into a cylindrical mold section in a manner consistent with the practice of the herein described example of the invention.

The invention employs reinforcing fibers such as glass fiber or equivalent material. A loose mat of such fiber, such as the fiber matting 10, is convolutely wound on a form or core 11 and is inserted in a cylindrical mold casing 12 as indicated in Figures 1 and 2. The form or core 11 is then withdrawn to leave the mold casing 12 lined with the convolutely wound fiber matting 10. The cylindrical mold casing 12 is provided with end flanges 13 which are adapted to close against cooperating flanges on other mold sections to be described below.

Figure 9:
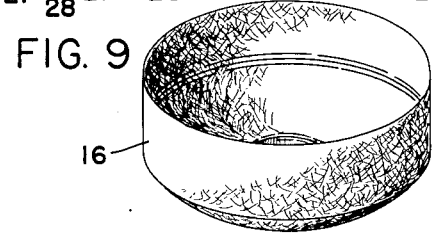
Figure 9 is a drawing of a fiber end cap which may be employed in the invention.

There are also provided fiber matting pieces in the shape of caps 16 and 17 which may be identical except that the upper cap 16 has a central hole formed therein. The cap 16 is shown in inverted position in Figure 9. The caps 16 and 17 may be shaped by conventional means which will be known to those familiar with the fabrication of fiber-reinforced molded articles. For example, fibers may be blown over cup-shaped screens to form a cup-shaped mat, and a light resin adhesive may be sprayed on the fibers as they accumulate on the screen to hold the fiber mat together during subsequent handling. The outer diameter of the caps 16 and 17 may be equal to the internal diameter of the convoluted mat 10 when it is positioned within the casing 12.

Upper and lower casing caps 20 and 21 are provided. Suitable flanges on these caps are adapted to close against the end flanges 13 of the cylindrical mold casing 12. The internal surfaces of the casing caps are in the shape of oblate ellipsoids of revolution or they may be hemispherical. They may also have other shapes which, however, will be less adaptable to the production of a strong tank structure. This is important inasmuch as applications to which the invention relates must usually be capable of withstanding pressures of as much as 500 p.s.i. The inner surface of the upper casing cap 20 is centrally relieved as at 25 and is provided with a central annular rib 22 and with vent sleeves or passages 23. The flange of the upper casing cap is provided with a suitable sealing ring 24. The lower casing cap 21 is provided with a central resin supply line 26. A deep annular groove 27 is formed around the lower casing cap. A plurality of drains or sprues 28 open downwardly from the bottom of the annular groove 27. The flange associated with the lower casing cap is provided with a suitable sealing ring 29.

A flexible envelope is provided for expansion against the fiber lining. An orifice structure associated with this envelope is adapted to be inserted upwardly through the central opening in the upper fiber cap 16 and through a central opening in the casing cap 20, radially inwardly of the annular rib 22. The flexible envelope may comprise a rubber bag 30 encased in a protective sheath of polyvinyl acetate film or cellophane film or similar material which will protect the molding materials against chemical action of vulcanizing agents or residues thereof associated with the bag 30. The bag 30 and protective sheath 31 are supported on a flanged and threaded neck 32 and are sealed thereto by suitable washers and gaskets 33 which are clamped by tightening of nut 35 threadedly engaged on the outer end of the neck 32. When filled but not dilated the bag preferably has a volume approximately equal to the difference between the volume of the chamber defined by the casing members 12, 20 and 21 and the volume occupied by the mats 10, 16 and 17.

Figure 11:
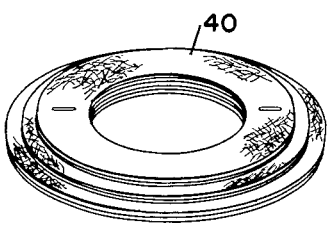
Figures 10 and 11 are drawings of additional fiber forms which may be employed in the practice of the invention.
Figure 10:
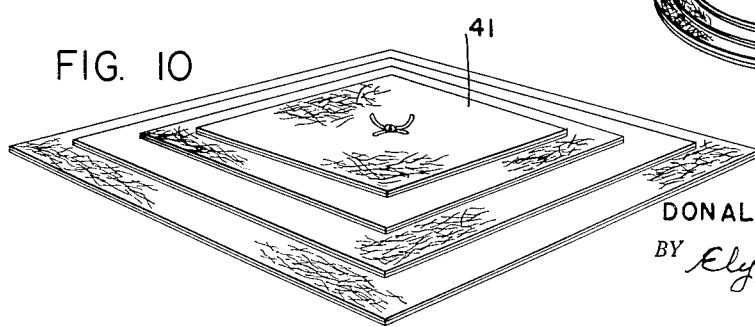

There are also provided round rings of fiber matting 40 of progressively varying sizes, which may be stitched together for convenience in handling, as shown in Figure 11. These are also provided squares of fiber matting 41 of progressively varying sizes, also stitched together, as shown in Figure 10.

Figure 3:
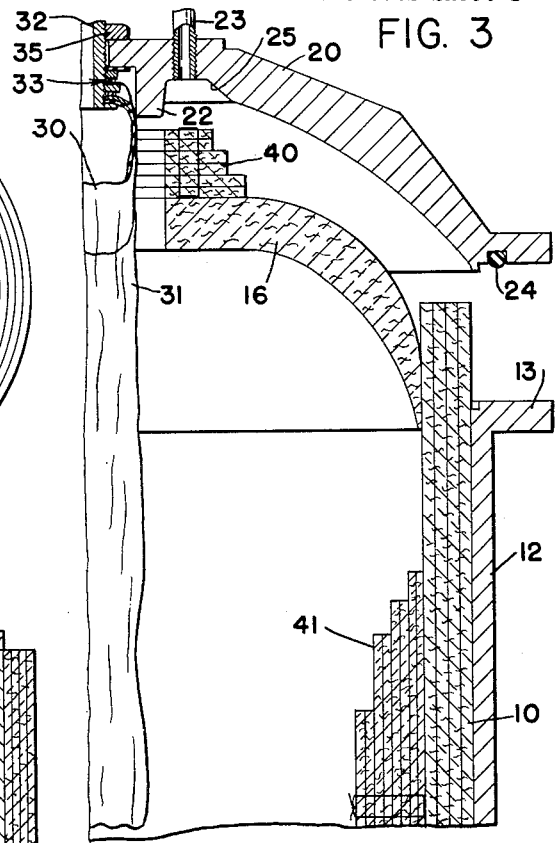
Figure 3 is a view in cross-section of the top right-hand portion of molding apparatus embodying the practice of the invention, the mold sections being parted and fiber forms being inserted into place to be subsequently impregnated and molded according to the invention.
Figure 4:
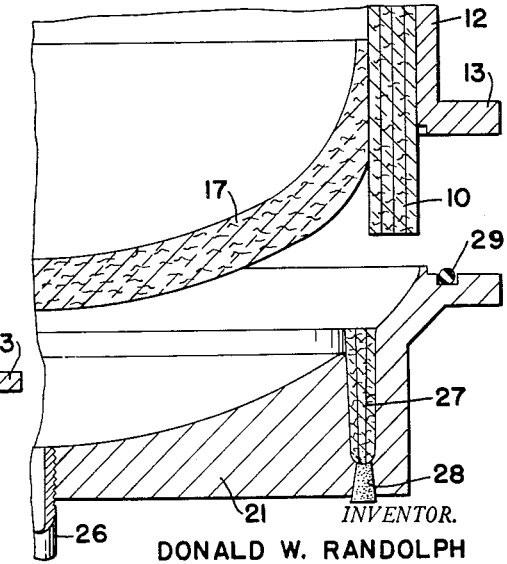
Figure 4 is a view similar to Figure 3, showing the lower right-hand portion of apparatus embodying the practice of the invention.
Figure 5:
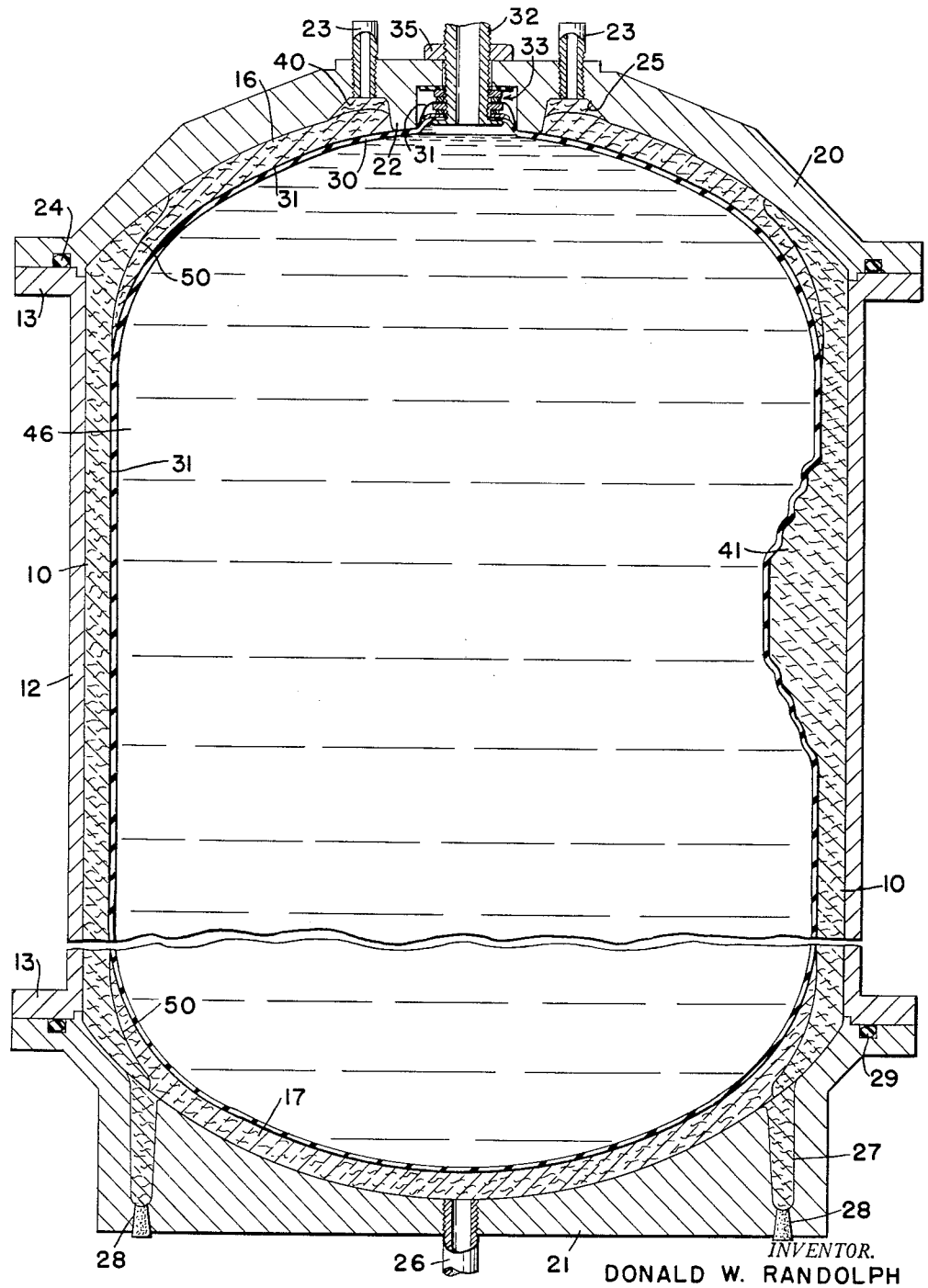
Figure 5 is a cross-sectional view showing molding apparatus embodying the practice of the invention with all mold sections closed and with a central expanding envelope almost fully expanded but with no resin as yet introduced into the mold.

Prior to the molding operation, the convolutely wound fiber matting 10 is inserted in the cylindrical casing 12 as above described, and pairs of groups of square matting 41 are tacked to one side of the convolutely wound matting 10 at the top and bottom thereof. The upper group of tacked-on squares is indicated in Figures 3 and 5. The purpose of these pads is to provide added thickness in the side wall of the tank at points where pipe connections are to be made. The size and shape of these added mats may be made so as to reinforce the tank if it is subjected to external pressure. In this case the pad may take the form of a complete ring around the inner circumference of the tank. The fiber caps 16 and 17 are telescoped within the ends of the convolutely wound matting as indicated in Figures 3 and 4. A group of rings 40 is tacked around the central opening of the upper fiber cap 16 as indicated in Figure 3. The annular groove 27 in the lower casing cap 21 is stuffed with fibers as indicated in Figure 4.

The casing members are closed together and the flexible envelope comprising the rubber bag 30 is filled with fluid, for example, liquid, so that the weight of the incompressible liquid will hold the outer surface of the flexible envelope in contact with substantially the entire surface of the fiber matting lying within the molding chamber. However, the bag exerts only a light pressure to moderately compress the fiber matting or lining. The pressure head due to the weight of the body of liquid in the rubber bag causes somewhat greater compression of the fiber lining adjacent the bottom of the molding chamber, which, throughout the molding operation, is maintained more nearly vertical than horizontal and preferably in a substantially upright position. A measured amount of resin 45 is then introduced through the supply line 26. The amount of resin introduced is such that the charge will permeate the entire fiber lining during the subsequent compressing operation. Preferably a slight excess of resin is provided. The resin comprises any suitable thermosetting resin adapted to be set at temperatures above room temperature. It is preferred that a resin be employed that will set at about 200–220° F. Resins adaptable to the purposes herein described will be well known to the art, and in general, high-temperature-resistant thermosetting resins of the type usually known as polyester resins, such as epoxy resins or styrene-phthalic anhydride condensation products may be employed together with suitable setting agents adapted to control setting temperature, all as is well known in the art.

As the resin is introduced into the bottom of the molding chamber and rises around the bag 30, it forces air within the fiber matting out through the upper vents 23. The rising column of resin displaces the air, but at no time is the fiber lining wetted with resin ahead of the path of escaping air. When using liquid to fill the bag 30, the incompressibility of the liquid within the bag prevents billowing of the bag at the lower corners thereof or elsewhere and thereby prevents the fibers from migrating upwardly with the rising resin by maintaining firm contact of the envelope with the matting over the entire inner surface of the fiber lining.

Additional pressure is now applied by slowly feeding additional fluid 46 into the flexible envelope comprising the bag 30 to cause substantial compression of the fiber lining within the molding chamber. For example, a ½ inch fiber wall may be compressed to a final thickness of approximately 3/16 inch. The fluid 46 within the bag 30 may be a suitable non-compressible liquid such as water. Due to the weight of the incompressible liquid within the bag 30, at each given height a given compressing pressure is attained at a later time than the same pressure is attained at lower heights, although the pressure differential between different heights is relatively small. Due to the resultant diminution of the volume of the fiber lining, the resin 45 is expressed upwardly throughout the entire fiber lining. There is preferably a slight excess of resin which is expressed outwardly through the upper vents 23, thus signalling that impregnation of the entire fiber lining is complete. Permeation of the fiber lining at upper portions thereof may occur in large part while the fiber is still relatively loosely packed.

In some applications the above forming steps may be sufficient; however, in most applications it is preferred to complete final compression by removing plugs or caps from the drains or sprues 28, which had heretofore been closed, and thereupon slowly injecting additional fluid into the bag to apply an additional and ultimate compressing pressure to the liquid within the bag 30 to express additional excess resin both from the vents 23 and through the drains or sprues 28. This ultimate pressure is selected to produce the desired final wall thickness and desired final compaction of the fibers.

After the fiber body of the article has been thus impregnated and shaped within the mold, the casing of the mold is subjected to heat in order to set the resin. Heating elements or heating coils (not shown) of conventional structure are provided adjacent the mold casing members preferably in such a manner that uniform heating over all mold surfaces is achieved, in as great measure as possible, in a manner which will be familiar to those skilled in the art. Preferably, during heating of the mold and setting of the resin, the various vents 23 and drains or sprues 28 are plugged or capped. After setting of the resin, the mold is inverted and the bag 30 is drained, collapsed and withdrawn through the mouth of the formed article, the casing cap 20 being released from the casing 12 during this operation. The built-up or reinforced sections formed by the groups of squares 41 are then centrally drilled to provide inlet and outlet ports for the final product, which openings may be threaded to receive connecting pipes.

The casing cap 21 is also removed from the casing 12 and the nut 35 is turned off and the bag 30 is released from the casing cap 20 prior to emplacement of new fiber mats incident to a succeeding molding operation.

It will be noted that the initial seams 50 between the fiber caps and the cylindrical fiber wall extend as tapered-lap seams across the corners or junctures between the end cap portions of the final product and the cylindrical sidewall portions of the final product, and that these seams are permeated by a homogeneous body of set resin to form an overall integral body.

It is preferred that during the final compressing operation, the water or other fluid forced into the bag 30 be supplied at a slow and constantly diminishing rate, as by maintaining a constant air pressure on a reserve supply of liquid in a reservoir with which the inlet neck 32 communicates. A suitable adjustable air pressure regulator of a conventional type may be provided to closely control the air pressure in the reservoir and thus furnish close control of the rate of feed of liquid into the bag 30. The air pressure is preferably maintained constant during the compressing step, so that the rate of flow of compressing liquid into the bag 30 becomes slower and slower as maximum compressing pressure is approached. In those cases where final compression is completed by opening the drains or sprues 28 and injecting additional liquid into the bag 30 to apply an additional and ultimate compressing pressure, as mentioned above, the air pressure in the reservoir may be adjusted upwardly for this final compressing step by changing the setting of the air pressure regulator to a higher constant setting, so that the rate of flow of the additional liquid into the bag 30 also becomes slower and slower as ultimate compressing pressure is approached. In a typical application, ultimate compressing pressure in the bag 30 might be in the order of 25 or 30 p.s.i., although higher or lower pressures may be desired in different jobs. A pressure gage may be provided in the line which connects the inlet neck 32 to the reservoir.

Figure 6:
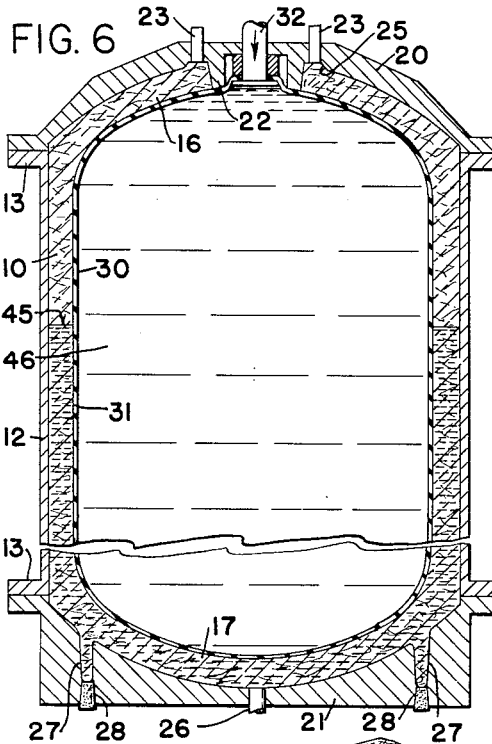
Figure 6 is a view similar to Figure 5 but more schematic in nature showing apparatus embodying the practice of the invention just following introduction of resin into the mold.
Figure 7:
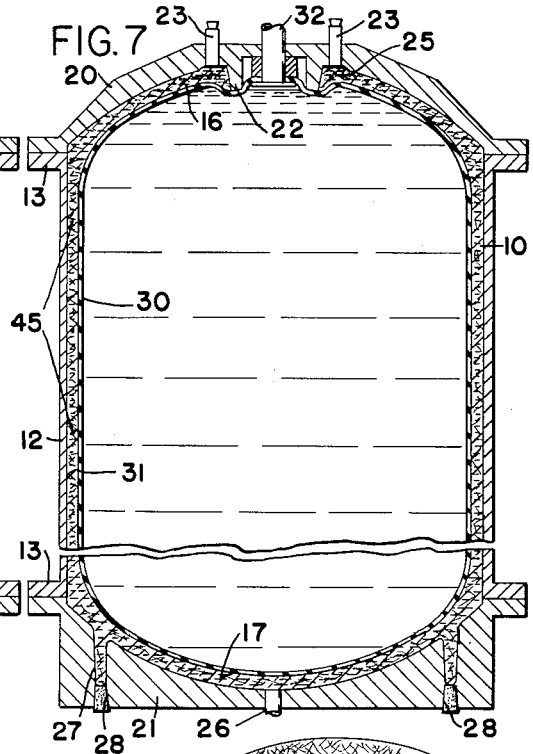
Figure 7 is a view similar to Figure 6 showing apparatus embodying the practice of the invention, following the step of compressing the fiber walls which have been laid up within the molding chamber and which have been impregnated with resin.
Figure 8:
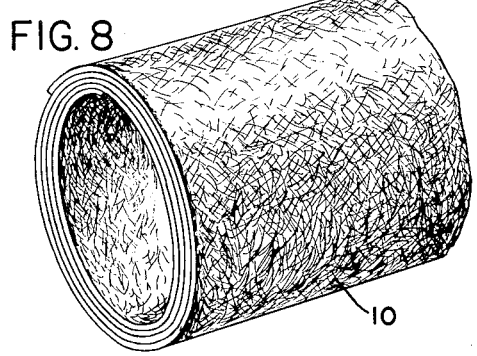
Figure 8 is a perspective drawing of a cylinder fiber matting which may be employed in the invention.

Figures 6 and 7 are intended to illustrate, somewhat schematically, certain steps in the manufacture of articles according to the invention. Figure 6 shows apparatus employed in the invention prior to the final compressing or forming step. The fiber lining is moderately compressed, and the level of the resin 45 may be slightly above the half-way height of the molding chamber at the conclusion of feed, as shown. Figure 7 shows the same apparatus and fully impregnated lining subsequent to the final compressing or forming step and just prior to the step of heat setting the formed article.

The various fiber mattings and caps will most advantageously comprise glass fiber, due to the high strength properties of these fibers. The service life of articles formed in accordance with the general objects of the present invention can be further improved by forming each of such mattings and caps with an inner layer or lining of acrylic fibers, for example a copolymer of vinyl chloride and acrylonitrile formed as relatively fine fibers.

The above described example of the invention may be varied without departing from the scope of the invention. For example, the central mold casing and the central portion of the tank need not necessarily be cylindrical, although generally a central portion of tubular shape is preferable. Other possible modifications of the details of the disclosed example of the invention will suggest themselves. The invention is not limited to all the details of the illustrated example but is defined by the following claims.

What is claimed is:

1. In the manufacture of fiber-reinforced molded resin tanks having a long dimension, the steps of completely encasing a substantially closed, porous, hollow body of loosely matted fibers within a rigid molding chamber providing an inner surface which constitutes the matrix of the shape of the final product and therefore has a corresponding long dimension, filling a flexible envelope which is positioned within said chamber with pressurizing liquid to cause said envelope to be pressed by the pressure of said liquid against the inside of the hollow fiber body and to compress and hold the hollow fiber body against the inner surface of the molding chamber, injecting a measured amount of liquid thermosetting resin into said chamber while venting the top of said chamber and while maintaining the long dimension of said chamber more nearly vertical than horizontal, whereby said resin permeates a portion of said hollow fiber body and air is expressed from said hollow fiber body through said top venting, thereupon introducing additional liquid into said envelope, while maintaining the long dimension of said chamber more nearly vertical than horizontal and while venting the top of said chamber, until said hollow fiber body is further compressed and the resin is distributed throughout said hollow body and air remaining in said walls is expressed through said top venting, and applying heat to set the resin as a homogenous continuous body throughout said hollow fiber body.

2. A method of making a fiber-reinforced molded resin tank comprising the steps of rolling a pliable and compressible, loose and porous, fiber mat into cylindrical form, inserting said rolled mat into a rigid cylindrical casing, substantially closing the ends of said form with pliable and compressible, porous, loosely matted, fiber caps to provide a hollow fiber body with the edges of the caps and the edges of the form in overlapping relation, backing the fiber caps with rigid casing caps which close the end of the cylindrical casing to form a substantially closed molding chamber providing an inner surface, filling a flexible envelope which is positioned within said chamber with pressurizing liquid to cause said envelope to be pressed by the pressure of said liquid against the inside of the hollow fiber body and to compress and hold the hollow fiber body against the inner surface of the molding chamber, injecting a measured amount of liquid thermosetting resin into said chamber whereby said resin permeates at least a portion of said hollow fiber body, thereupon introducing additional pressurizing liquid into said envelope, while venting said chamber remotely from said resin, until the resin is distributed throughout said hollow body and expressed air is relieved through said venting, and said hollow fiber body is further compressed with the overlaps between the fiber cylindrical form and the fiber caps being flattened to constitute tapered-lap seams, and thereupon subjecting said molding chamber to heat to set the resin as a homogenous continuous body extending throughout said hollow fiber body and the seams therein.

3. A method of making a fiber-reinforced molded resin tank comprising the steps of shaping a pliable and compressible, porous tubular form of loosely matted fibers, inserting said tubular form into a rigid tubular casing, substantially closing the ends of said tubular form with pliable and compressible, porous, loosely matted fiber caps to provide a hollow fiber body with the edges of the caps and the edges of the tubular form in overlapping relation, backing the fiber caps with rigid casing caps which substantially close the end of the tubular casing to form a rigid molding chamber, filling a flexible envelope which is positioned within said chamber with pressurizing liquid to cause the wall of said envelope to be pressed by the pressure of said liquid against the inside of the hollow fiber body and to compress and hold the hollow fiber body against the inside of said rigid molding chamber, injecting a measured amount of impregnating liquid which is subject to the action of a setting agent into said chamber while maintaining said casing more nearly vertical than horizontal and while venting the top of said chamber whereby said impregnating liquid permeates a portion of said hollow fiber body and air is expressed from said fiber body through said venting, then introducing additional pressurizing liquid into said envelope while maintaining said casing more nearly vertical than horizontal and while venting the top of said chamber until the impregnating liquid is distributed throughout said hollow body and additional air is expressed therefrom through said venting and said hollow fiber body is further compressed with the overlaps between the tubular form and the fiber caps being flattened to constitute tapered-lap seams, and thereupon subjecting said impregnating liquid to the action of a setting agent to set the impregnating liquid.

4. A method of making a fiber-reinforced molded resin tank comprising the steps of shaping a pliable and compressible, porous, tubular, form of loosely matted fibers, inserting said tubular form into a rigid tubular casing, substantially closing the ends of said tubular form with pliable and compressible, porous, loosely matted fiber caps to provide a hollow fiber body with the edges of the caps and the edges of the tubuar form in overlapping relation, backing the fiber caps with rigid casing caps which substantially close the ends of the tubular casing to form a rigid molding chamber, filling a flexible envelope which is positioned within said chamber with pressurizing liquid to cause the wall of said envelope to be pressed by the pressure of said liquid against the inside of the hollow fiber body and to compress and hold the hollow fiber body against the inside of said rigid molding chamber, injecting a measured amount of impregnating liquid which is subject to the action of a setting agent into said chamber while maintaining said casing more nearly vertical than horizontal and while venting the top of said chamber whereby said impregnating liquid permeates a portion of said hollow fiber body and air is expressed from said fiber body through said venting, thereupon introducing additional pressurizing liquid into said envelope while venting the top of said chamber until the impregnating liquid is distributed throughout said hollow body and additional air is expressed therefrom through said venting, and said hollow fiber body is further compressed with the overlaps between the fiber tubular form and the fiber caps being flattened to constitute tapered-lap seams, and thereupon subjecting said impregnating liquid to the action of a setting agent to set the impregnating liquid.

5. In the manufacture of impregnated fiber articles, the steps of preforming at least two porous, pliable bodies of loosely matted fibers, positioning one side of said bodies against a generally conforming mold surface with adjacent edges of the bodies overlapping one another, forcibly expanding a flexible membrane against the opposite side of said bodies so as to press the overlapping edge portions thereof together while compressing the bodies against the mold to restrain movement of the bodies relative to each other and to the mold, injecting a settable liquid resin into at least one of said bodies while maintaining the compressing force of said membrane against the bodies, and thereafter increasing the pressure of said membrane against said bodies to further compress the same and the joint therebetween until at least some excess resin is expressed from said bodies, and maintaining said increasing membrane pressure until the resin is set to form a substantially homogeneous, monolithic, resin-impregnated article of said two bodies and resin.

6. In the manufacture of impregnated fiber articles, the steps of preforming at elast two porous, pliable bodies of loosely matted fibers to constitute adjoining wall portions of a concavo-convex shell, positioning convex sides of said bodies aganist a generally conforming concave mold surface with adjacent edges of the bodies overlapping one another, forcibly expanding a flexible membrane against the opposite side of said bodies so as to press the overlapping edge portions thereof together while compressing the bodies against the mold to restrain movement of the bodies relative to each other and to the mold, injecting a settable liquid resin upwardly into at least one of said bodies through a lowermost portion of the mold while maintaining the compressing force of said membrane against the bodies and venting an uppermost portion of the space between the mold and the membrane for exhausting air therefrom, and thereafter increasing the pressure of said membrane against said bodies to further compress the same and the joint therebetween until the resin is uniformly distributed therethrough and at least some of the resin is expressed from the bodies through said venting, and maintaining said increased membrane pressure until the resin is set to form a substantially homogeneous, monolithic, resin-impregnated article of said two bodies and resin.

7. A method of making an impregnated-fiber tank comprising the steps of rolling a pliable and compressible, porous sheet of loosely matted fibers into a cylindrical form, inserting said mat into a rigid cylindrical casing, substantially closing the ends of said form with pliable and compressible, porous, caps of loosely matted fibers to provide a hollow fiber body with the edges of the caps and the edges of the cylindrical form in overlapping relation, backing the fiber caps with rigid casing caps which substantially close the ends of the cylindrical casing about the hollow fiber body, positioning a flexible envelope within said hollow fiber body in the course of assembling and enclosing the same in the cylindrical casing, inflating said envelope, then injecting liquid resin into the mold and distributing it throughout the pores of the hollow fiber body with said envelope inflated against the interior surface thereof to hold said cylindrical form and end caps against the interior surface of the closed cylindrical chamber and restrain movement of the cylindrical form and end caps relative to one another and to the casing, and keeping said envelope so inflated until the resin is set.

8. In the manufacture of fiber-reinforced molded resin articles, the steps of preforming at least two pliable and compressible bodies of loosely matted fibers, positioning one side of said bodies against a generally conforming mold surface with adjacent edges of the bodies overlapping one another, the overlapped edge portion of at least one of said bodies, as preformed, tapering to a reduced thickness at said edge, expanding a flexible membrane against the opposite side of said bodies so as to press the overlapping edge portions thereof together while compressing the overlapping bodies against the mold to partially compress the bodies and restrain movement thereof relative to each other and to the mold, injecting a settable liquid resin into at least one of said bodies while they are so restrained, thereafter increasing the pressure of said membrane against said bodies to further compress the same and the joint therebetween until the overlapped edge portions of said bodies are flattened to form a tapered lap seam therebetween and at least some excess resin is expressed from said bodies, and maintaining said increased membrane pressure until the resin is set to form a substantially homogeneous, monolithic, fiber-reinforced article.

9. A method of making fiber-reinforced molded resin tanks, comprising the steps of preforming a tubular form of pliable and compressible, porous, loosely matted fibers, inserting said tubular form into a rigid cylindrical casing, substantially closing the ends of said tubular form with pliable and compressible, porous end caps of loosely matted fibers to provide a hollow fiber body with the edges of said end caps and edges of the tubular form in overlapping relation, at least one of the overlapping edge portions of fiber matting at each end of the hollow body tapering to a reduced thickness at the overlapped edge thereof, backing the fiber caps with rigid casing caps to substantially completely enclose the hollow fiber body in a rigid mold, except for at least one vent provided therein, positioning a flexible envelope within said hollow fiber body in the course of assembling and enclosing the same, inflating said envelope to hold said tubular form and end caps in place against the mold, then injecting a settable liquid resin into the mold adjacent the bottom thereof, further inflating said envelope to progressively compress said hollow fiber body against the mold until excess resin is expressed therefrom through said vent, and maintaining the hollow fiber body under pressure from said envelope until said resin is set.

References Cited in the file of this patent

UNITED STATES PATENTS

| | | |
|---|---|---|
| 836,905 | Whitehouse | Nov. 27, 1906 |
| 2,175,204 | Lougheed | Oct. 10, 1939 |
| 2,202,042 | Blount | May 28, 1940 |
| 2,441,097 | Hicks | May 4, 1948 |
| 2,460,820 | Hagopian | Feb. 8, 1949 |
| 2,495,640 | Muskat | Jan. 24, 1950 |
| 2,517,090 | Denning | Aug. 1, 1950 |
| 2,556,590 | Long | June 12, 1951 |
| 2,739,917 | Schulze | Mar. 27, 1956 |
| 2,744,043 | Ramberg | May 1, 1956 |
| 2,760,896 | Nash | Aug. 28, 1956 |
| 2,766,161 | Hagopian et al. | Oct. 9, 1956 |
| 2,773,287 | Stout | Dec. 11, 1956 |
| 2,815,534 | Ising et al. | Dec. 10, 1957 |
| 2,913,036 | Smith | Nov. 17, 1959 |